(12) United States Patent
Inuzuka

(10) Patent No.: US 7,165,922 B2
(45) Date of Patent: Jan. 23, 2007

(54) CUTTING TOOL ASSEMBLY HAVING CONSTRUCTION ENABLING CUTTING TOOL TO HAVE LARGE DIAMETER

(75) Inventor: Toru Inuzuka, Hoi-Gun (JP)

(73) Assignee: OSG Corporation, Aichi (JP)

( * ) Notice: Subject to any disclaimer, the term of this patent is extended or adjusted under 35 U.S.C. 154(b) by 172 days.

(21) Appl. No.: 10/663,067

(22) Filed: Sep. 15, 2003

(65) Prior Publication Data
US 2004/0156691 A1 Aug. 12, 2004

(30) Foreign Application Priority Data
Feb. 12, 2003 (JP) .............................. 2003-033064

(51) Int. Cl.
*B23C 1/00* (2006.01)
*B23C 5/00* (2006.01)
*B23C 5/26* (2006.01)
(52) U.S. Cl. .................. 409/234; 409/232; 407/30; 407/40; 408/239 R
(58) Field of Classification Search .............. 409/234, 409/232; 408/239 R, 239 A, 238; 279/8; 407/30, 40
See application file for complete search history.

(56) References Cited

U.S. PATENT DOCUMENTS

| | | | | |
|---|---|---|---|---|
| 3,586,343 | A * | 6/1971 | Reed ........................ | 409/232 |
| 4,325,664 | A * | 4/1982 | Mori ........................ | 409/234 |
| 4,583,890 | A * | 4/1986 | Ewing et al. ............. | 408/239 A |
| 5,383,261 | A * | 1/1995 | Yamamoto et al. ......... | 29/40 |
| 5,593,258 | A * | 1/1997 | Matsumoto et al. ........ | 409/234 |
| 5,660,480 | A * | 8/1997 | Fujii et al. ................. | 384/107 |
| 5,678,967 | A * | 10/1997 | Savoie ........................ | 409/233 |
| 6,036,413 | A * | 3/2000 | Chandrasekar ............ | 409/231 |
| 6,276,879 | B1 * | 8/2001 | Hecht ........................ | 409/234 |

FOREIGN PATENT DOCUMENTS

JP 10-6120 1/1998

OTHER PUBLICATIONS

Oberg, Erik, et. al., Machinery's Handbook, 2000, Industrial Press, Inc., 26th edition, p. 922.*

* cited by examiner

*Primary Examiner*—Monica Carter
*Assistant Examiner*—Eric A. Gates
(74) *Attorney, Agent, or Firm*—Muramatsu & Associates

(57) ABSTRACT

A cutting tool assembly including: (a) an arbor including a tapered shank portion which has a taper of 7/24 and a size of No. 30; (b) a cutting tool having at least one cutting blade and fastened to the arbor; (c) a fastener for fastening the cutting tool to the arbor; and (d) a relative-rotation preventing mechanism for preventing rotation of the cutting tool relative to the arbor. The cutting tool assembly has a weight of not larger than 3 kg. The arbor and the cutting tool have respective contact surfaces which are held in contact with each other. The relative-rotation preventing mechanism is provided by at least one receiving hole which is formed in one of the contact surfaces, and at least one protrusion which is formed on the other of the contact surfaces and which is received in the above-described at least one receiving hole.

8 Claims, 3 Drawing Sheets

PRIOR ART

CUTTING TOOL ASSEMBLY HAVING CONSTRUCTION ENABLING CUTTING TOOL TO HAVE LARGE DIAMETER

BACKGROUND OF THE INVENTION

1. Field of the Invention

The present invention relates in general to a cutting tool assembly, and more particularly to such a cutting tool assembly having a weight which is reduced without reducing rigidity of the tool assembly, for permitting a cutting tool of a large cutting diameter to be used in a small-sized machine tool with a spindle nose having a size of No. 30.

2. Discussion of the Related Art

It is common that a cutting tool such as a face milling cutter is attached to a spindle of a machine tool via a cutting tool holder or arbor. It is also common that the cutting tool is fastened to the arbor by means of a single screw bolt which is adapted to pass through a center hole of the cutting tool and is tightly screwed into an internally threaded hole of the arbor, as defined in JIS and ISO, where the cutting tool has a cutting diameter of not larger than 160 mm. JP-A-H10-6120 (publication of unexamined Japanese Patent Application laid open in 1998) discloses an example of such a cutting tool assembly, particularly, in its paragraph and FIG. 2.

FIG. 3 is a view showing a conventional cutting tool assembly including an arbor 100 and a face milling cutter 200. This cutting tool assembly is designed to be used in a machining center having a spindle nose of BT No. 30 (7/24 taper No. 30). The arbor 100 has a tapered shank portion 101 located in its axially proximal end portion, and an annular flange portion 102 located on the lower side of the tapered shank portion 101. The annular flange portion 102 has a circumferentially extending V-shaped groove which is to be brought into engagement with an arm of an automatic tool changer (ATC) of the machining center.

The arbor 100 further has an axial extension portion 103 located on the lower side of the annular flange portion 102 and axially extending over a predetermined distance, and a positioning boss 104 formed on the center of a lower end face of the axial extension portion 103. A pair of keys 105 are fixed onto an outer circumferential surface of the axial extension portion 103, by suitable fastening means such as screw bolts. The face milling cutter 200 has, in its upper end face, a positioning hole 201 and a pair of slots 202 for receiving the positioning boss 104 and the keys 105.

For fastening the face milling cuter 200 to the arbor 100, the positioning boss 104 and the keys 105 of the arbor 100 are first introduced into the positioning hole 201 and the slots 202 of the cutter 200. A hexagonal-head bolt 300 is then screwed into an internally threaded hole formed in an end face of the positioning boss 104 of the arbor 100, so that the cutter 200 is tightened between the arbor 100 and the bolt 300. While the cutter 200 and the arbor 100 are being thus fastened to each other, the cutter 200 and the arbor 100 are prevented from being rotated relative to each other, owing to the engagements of the slots 202 and the keys 105.

In the manufacture industry these days, there is a demand for reduced sizes of machining equipment, for satisfying requirements for reduction in required floor spaces, energies and costs. In this respect, there is a tendency of replacement of machine tools having spindle noses of BT No.40 with machine tools having spindle noses of BT No.30. However, in general, a machine tool with a spindle nose of BT No.30 is not capable of holding a heavy tool assembly whose weight is larger than about 3 kg, due to the relatively small mechanical rigidity of its components such as its spindle. Due to the limitation in the weight of the tool assembly, a large-sized cutting tool can not be used for the machine tool with the BT No.30 spindle nose. For example, a face milling cutter having a cutting diameter of larger than 80 mm can not be mounted on the machine tool with the BT No.30 spindle nose. That is, a milling operation with a large-sized face milling cutter can not be practiced in the machine tool with the BT No.30 spindle nose.

There are many workpieces each of which can be machined at its surface with a single tool path of a large-sized face milling cutter (e.g., having a cutting diameter of about 125 mm) but can not be machined at its surface with a single tool path of a small-sized face milling cutter (e.g., having a cutting diameter of about 63 mm) which is commonly used in the machine tool with the BT No. 30 spindle nose. That is, in the machining operation with the machine tool of the BT No. 30 spindle nose, such a workpiece has to be machined with successive two or more of tool paths of the face milling cutter, so that a step is inevitably formed along an overlapped portion of the surface which portion has been subjected to a tool path of the cutter and also to the subsequent tool path of the cutter. There are many cases where the face milling is effected in the machine tool of the BT No. 40 spindle nose (for avoiding the formation of the undesirable step on the machined surface) while the other machining (e.g., drilling and tapping) following the face milling is effected in the machine tool of the BT No. 30 spindle nose. Such a transfer of the workpiece between the two machine tools requires additional steps and accordingly leads to deterioration in the machining efficiency.

SUMMARY OF THE INVENTION

It is therefore an object of the present invention to provide a cutting tool assembly having a weight which is advantageously reduced without undesirably reducing rigidity of the tool assembly, for making it possible to use a cutting tool having a larger cutting diameter in a small-sized machine tool with a spindle nose having a size of No. 30. This object may be achieved according to any one of first through eighteenth aspects of the invention which are described below.

The first aspect of this invention provides a cutting tool assembly comprising: (a) an arbor including a tapered shank portion which has a taper of 7/24 and a size of No. 30; (b) a cutting tool having at least one cutting blade and fastened to the arbor; (c) a fastener for fastening the cutting tool to the arbor; and (d) a relative-rotation preventing mechanism for preventing rotation of the cutting tool relative to the arbor, wherein the cutting tool assembly has a weight of not larger than 3 kg, wherein the arbor and the cutting tool have respective contact surfaces which are held in contact with each other, and wherein the relative-rotation preventing mechanism is provided by at least one receiving hole which is formed in one of the contact surfaces, and at least one protrusion which is formed on the other of the contact surfaces and which is received in the above-described at least one receiving hole.

According to the second aspect of the invention, in the cutting tool assembly defined in the first aspect of the invention, each of the above-described at least one protrusion is provided by a pin which is fitted in a fitting hole formed in the other of the contact surfaces.

According to the third aspect of the invention, in the cutting tool assembly defined in the first or second aspect of the invention, the cutting tool has a positioning hole which is formed in a central portion of the contact surface of the cutting tool, while the arbor has a positioning boss which is formed on a central portion of the contact surface of the arbor and which is received in the positioning hole, wherein the positioning hole and the positioning boss have an inside diameter and an outside diameter, respectively, which are not smaller than 22 mm and are not larger than 27 mm.

According to the fourth aspect of the invention, in the cutting tool assembly defined in any one the first through third aspects of the invention, the cutting tool has an axial length that is not larger than 40 mm.

According to the fifth aspect of the invention, in the cutting tool assembly defined in any one of the first through fourth aspects of the invention, a number of the above-described at least one cutting blade is not larger than six.

According to the sixth aspect of the invention, in the cutting tool assembly defined in any one of the first through fifth aspects of the invention, the arbor includes an annular flange portion which provides the contact surface and which has a pair of driving slots formed in an outer circumferential surface of the annular flange portion, wherein each of the above-described at least one protrusion is provided by a pin which is fitted in a fitting hole formed in the other of the contact surfaces, and wherein the fitting hole is positioned relative to the pair of driving slots such that the fitting hole does not overlap with each of the pair of driving slots as seen in an axial direction of the cutting tool assembly.

According to the seventh aspect of the invention, in the cutting tool assembly defined in any one of the first through sixth aspects of the invention, the above-described at least one receiving hole consists of a plurality of receiving holes located radially outwardly of an axis of the cutting tool assembly about which the cutting tool assembly is to be rotated, wherein the above-described at least one protrusion consists of a plurality of protrusions located in respective positions which are aligned with the plurality of receiving holes.

According to the eighth aspect of the invention, in the cutting tool assembly defined in any one of the first through seventh aspects of the invention, the cutting tool consists of a face milling cutter having a cutting diameter of 80–160 mm.

The ninth aspect of this invention provides an arbor which is to be fastened to a cutting tool, for providing a cutting tool assembly, the arbor comprising: (a) a tapered shank portion which has a taper of 7/24 and a size of No. 30; (b) a contact surface which is to be brought into contact with a surface of the cutting tool when the arbor is fastened to the cutting tool; and (c) a relative-rotation preventing mechanism for preventing rotation of the cutting tool relative to the arbor when the arbor is fastened to the cutting tool, wherein the relative-rotation preventing mechanism is provided by at least one protrusion which is formed on the contact surface.

According to the tenth aspect of the invention, in the arbor defined in the ninth aspect of the invention, each of the above-described at least one protrusion is provided by a pin which is fitted in a fitting hole formed in the contact surface.

According to the eleventh aspect of the invention, in the arbor defined in the ninth or tenth aspect of the invention, the arbor further comprises a positioning boss which is formed on a central portion of the contact surface, for positioning the cutting tool in a predetermined position relative to the arbor when the cutting tool is fastened to the arbor, wherein the positioning boss has an outside diameter which is not smaller than 22 mm and is not larger than 27 mm.

According to the twelfth aspect of the invention, in the arbor defined in any one of the ninth through eleventh aspects of the invention, the arbor further comprises an annular flange portion which provides the contact surface and which has a pair of driving slots formed in an outer circumferential surface of the annular flange portion, wherein each of the above-described at least one protrusion is provided by a pin which is fitted in a fitting hole formed in the contact surface, and wherein the fitting hole is positioned relative to the pair of driving slots such that the fitting hole does not overlap with each of the pair of driving slots as seen in an axial direction of the arbor.

According to the thirteenth aspect of the invention, in the arbor defined in any one of the ninth through twelfth aspects of the invention, the above-described at least one protrusion consists of a plurality of protrusions located radially outwardly of an axis of the arbor about which the arbor is to be rotated.

The fourteenth aspect of this invention provides a cutting tool which is to be fastened to an arbor including a tapered shank portion which has a taper of 7/24 and a size of No. 30, for providing a cutting tool assembly, the cutting tool comprising: (a) at least one cutting blade; (b) a contact surface which is to be brought into contact with a surface of the arbor when the cutting tool is fastened to the arbor; and (c) a relative-rotation preventing mechanism for preventing rotation of the cutting tool relative to the arbor when the cutting tool is fastened to the arbor, wherein the relative-rotation preventing mechanism is provided by at least one hole which is formed in the contact surface.

According to the fifteenth aspect of the invention, in the cutting tool defined in the fourteenth aspect of the invention, the cutting tool has an axial length that is not larger than 40 mm.

According to the sixteenth aspect of the invention, in the cutting tool defined in the fourteenth or fifteenth aspect of the invention, a number of the above-described at least one cutting blade is not larger than six.

According to the seventeenth aspect of the invention, in the cutting tool defined in any one of the fourteenth through sixteenth aspects of the invention, the above-described at least one hole consists of a plurality of holes located radially outwardly of an axis of the cutting tool about which the cutting tool is to be rotated.

According to the eighteenth aspect of the invention, in the cutting tool defined in any one of the fourteenth through seventeenth aspects of the invention, the cutting tool consists of a face milling cutter having a cutting diameter of 80–160 mm.

In the cutting tool assembly defined in any one of the first through eighth aspects of the invention, the relative-rotation preventing mechanism for preventing the rotation of the cutting tool relative to the arbor is provided by the receiving hole or holes formed in one of the contact surfaces and the protrusion or protrusions formed on the other contact surface. Thus, when the cutting tool is attached to the arbor, the rotation of the cutting tool relative to the arbor is prevented by the engagement of the receiving hole or holes with the protrusion or protrusions. This construction eliminates the conventionally required components, i.e., the keys and the axial extension portion (to which the keys are fixed), from the arbor. The elimination of the axial extension portion leads to remarkable reduction of the axial length of the arbor, which in turn results in advantageous reduction of the weight of the arbor without undesirable reduction of the rigidity of the arbor, for making it possible to use the cutting tool having a larger cutting diameter in a small-sized machine tool with a spindle nose having a size of No. 30. It is noted that the receiving hole or holes may be formed in either one of the contact surfaces of the arbor and the cutting tool. Where the receiving hole or holes are formed in the contact surface of the arbor, the protrusion or protrusions are formed in the contact surface of the cutting tool. Where the receiving hole or holes are formed in the contact surface of the cutting tool, the protrusion or protrusions are formed in the contact surface of the arbor.

In the cutting tool assembly defined in the third aspect of the invention, the positioning hole formed in the contact surface of the cutting tool has the inside diameter that is not larger than 27 mm. It is therefore possible to reduce the diameter of a core portion of the cutting tool which provides the contact surface, and accordingly to reduce the weight of the cutting tool by an amount corresponding to the reduction of the diameter of the core portion. This advantage (i.e., the reduction of the weight of the cutting tool) cooperates with the above-described advantage (i.e., the reduction of the weight of the arbor) to serve to further reduce the weight of the overall cutting tool assembly, thereby permitting a further increase of the cutting diameter of the cutting tool that is to be used in a small-sized machine with a spindle nose having a size of No. 30. Further, since the outside diameter of the positioning boss is not smaller than 22 mm, it is possible to form an internally threaded hole in an axial end face of the positioning boss, without a cylindrical wall of the positioning boss being adapted to have a considerably small thickness. That is, even with the formation of the threaded hole in the end face of the positioning boss, the arbor is provided with a sufficiently high rigidity.

The cutting tool assembly defined in the fourth aspect of the invention can have a further reduced weight, owing to its additional feature that the axial length of the cutting tool is adapted to be 40 mm or less.

The cutting tool assembly defined in the fourth aspect of the invention has an additional feature that the number of the above-described at least one cutting blade is not larger than six. While it is common that a cutting tool with a cutting diameter of about 125 mm is designed to have eight cutting blades, this feature (that the number of the cutting blades is not larger than six) is effective to reduce a cutting resistance acting on the cutting tool and accordingly reduce a load acting on a spindle of a machine tool. Therefore, even where a cutting operation is effected with the cutting tool of a large cutting diameter in a small-sized machine with a spindle nose having a size of No. 30, it is possible to move the cutting tool relative to a workpiece at a high feed rate so that the cutting operation can be carried out in a high degree of machining efficiency.

The cutting tool assembly defined in the sixth aspect of the invention has an additional feature that the fitting hole or holes formed in the contact surface of the arbor or the cutting tool do not overlap with each of the pair of driving slots as seen in the axial direction of the cutting tool assembly. In other words, the fitting hole or holes are spaced apart from each of the pair of driving slots in a direction perpendicular to the axial direction. This arrangement is effective to avoid considerable reduction of the rigidity of the annular flange portion of the arbor, namely, to assure the rigidity of the entirety of the cutting tool assembly, for thereby making it possible to perform a machining operation with a high degree of accuracy.

The arbor defined in any one of the ninth through thirteenth aspects of the invention provides the same technical advantage as the cutting tool assembly defined in any one of the first through eighth aspects of the invention.

Similarly, the cutting tool defined in any one of the fourteenth through eighteenth aspects of the invention provides the same technical advantage as the cutting tool assembly defined in any one of the first through eighth aspects of the invention.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which.

DETAILED DESCRIPTION OF THE PREFERRED EMBODIMENT

Figure 1A:
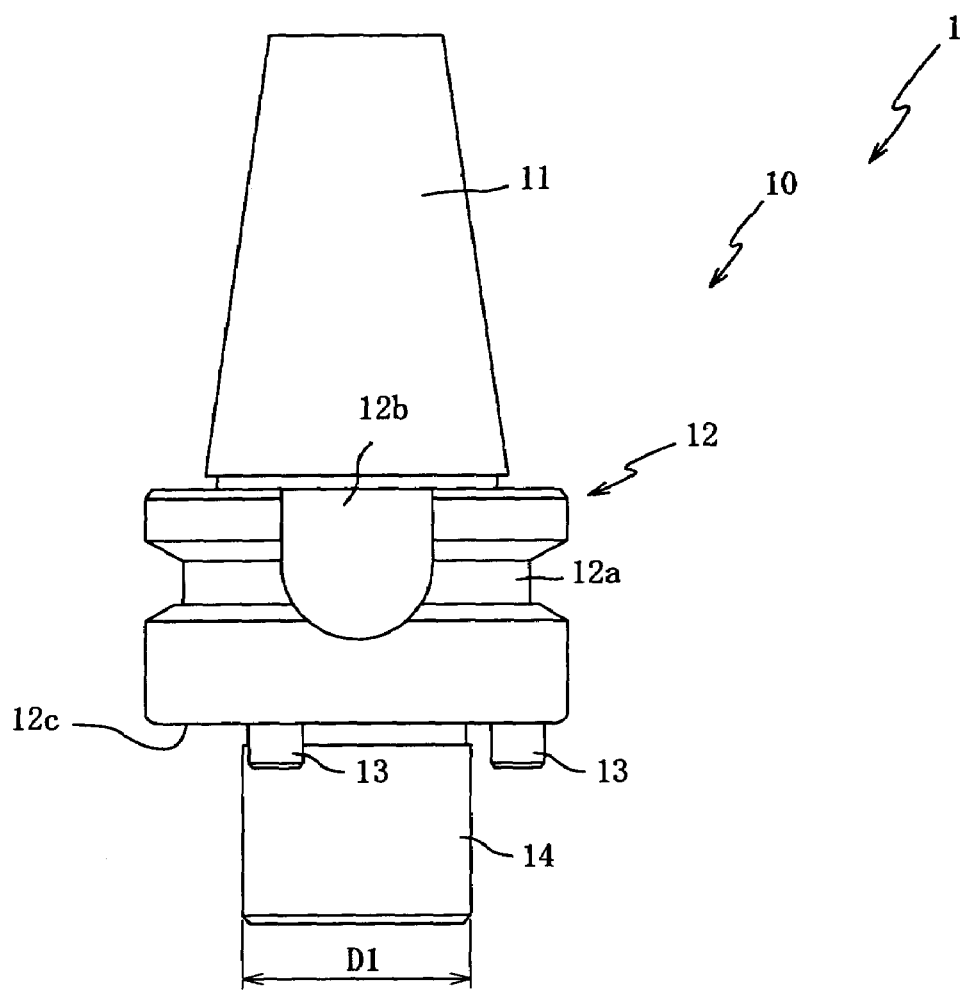
FIG. 1A is a front elevational view of an arbor constituting a part of a cutting tool assembly which is constructed according to an embodiment of this invention.
Figure 1B:
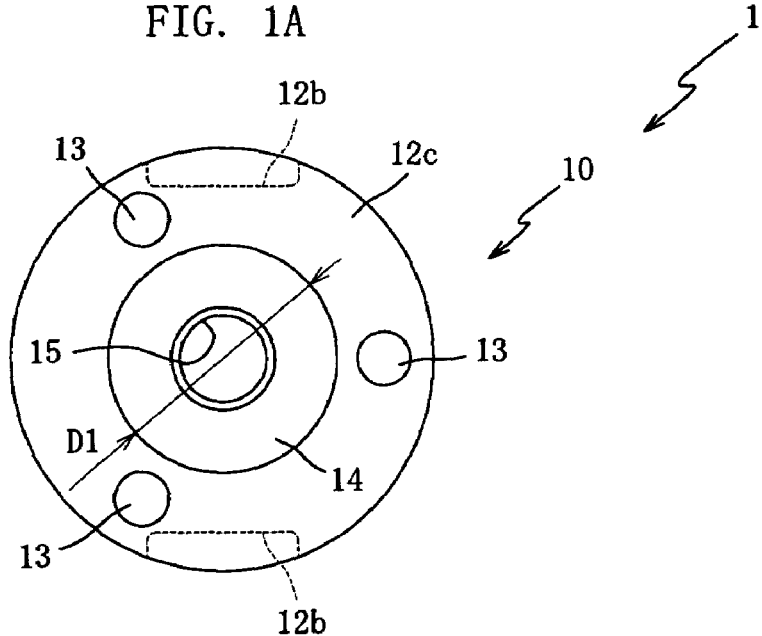
FIG. 1B is a bottom view of the arbor of FIG. 1A.
Figure 2A:
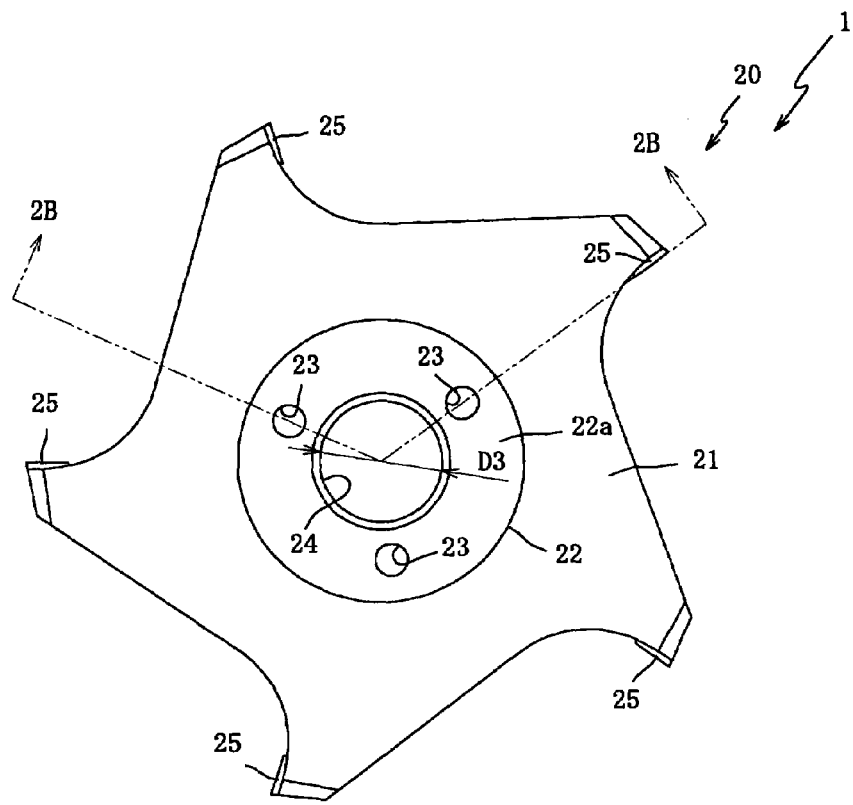
FIG. 2A is an upper view of a face milling cutter cooperating with the arbor of FIG. 1A to constitute the cutting tool assembly.
Figure 2B:
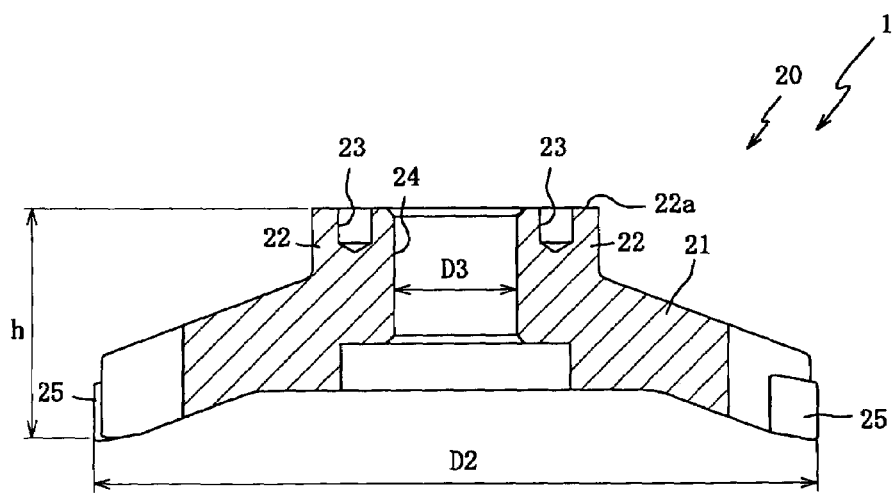
FIG. 2B is a cross sectional view taken along line 2B—2B of FIG. 2A.

There will be described a preferred embodiment of the invention by reference to the accompanying drawings. FIG. 1A is a front elevational view of an arbor 10 constituting a part of a cutting tool assembly 1 which is constructed according to the embodiment of the invention, while FIG. 1B is a bottom view of the arbor 10. FIG. 2A is an upper view of a rotary cutting tool in the form of a face milling cutter 20 which cooperates with the arbor 10 to constitute the cutting tool assembly 1, while FIG. 2B is a cross sectional view taken along line 2B—2B of FIG. 2A.

Figure 3:
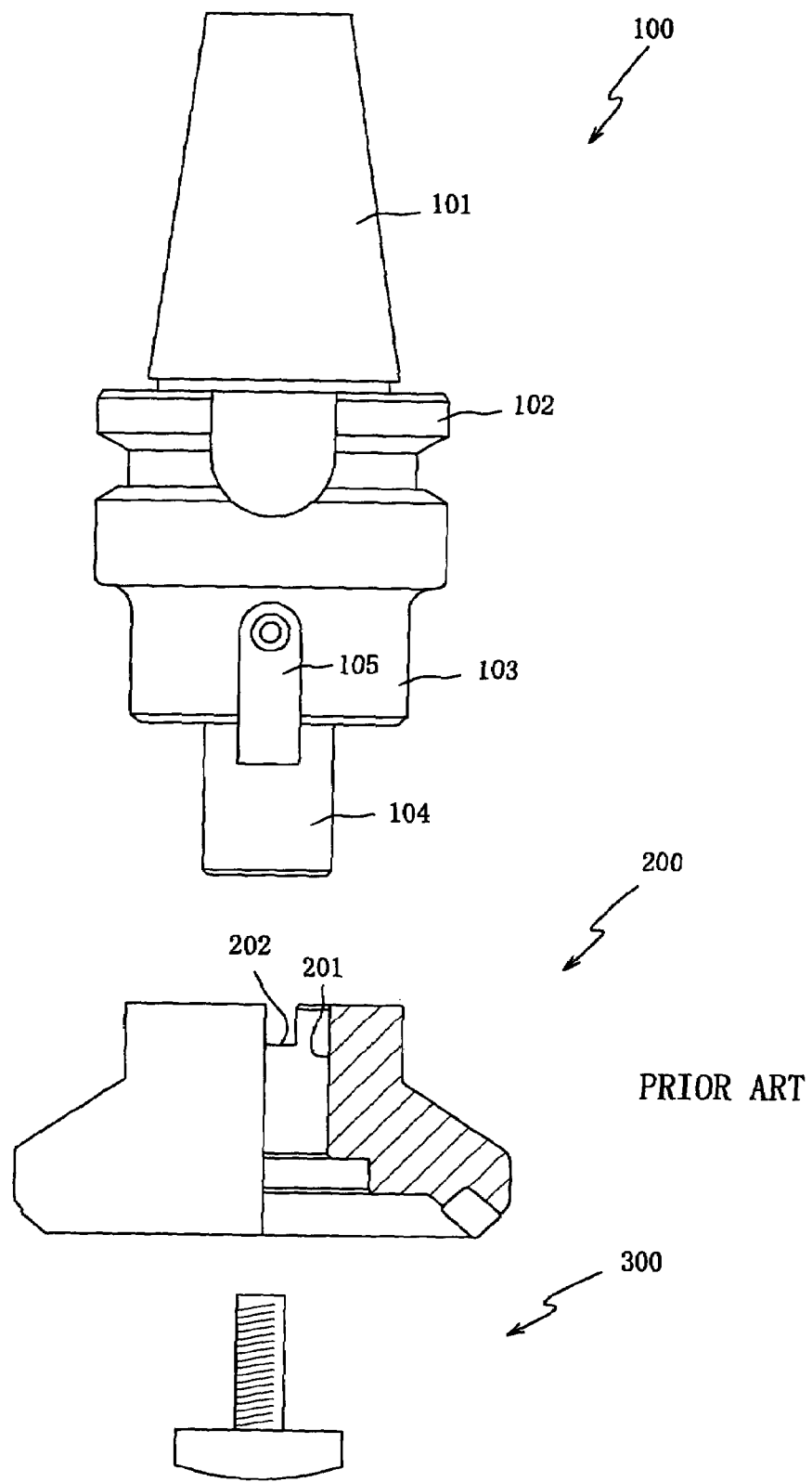
FIG. 3 is a view of an arbor and a face milling cutter constituting a conventional cutting tool assembly.

The cutting tool assembly 1 is designed to be used in a machine tool such as a machining center (hereinafter referred to as "MC") equipped with an automatic tool changer (ATC). Since the cutting tool assembly 1 has a smaller axial length than that of a conventional cutting tool assembly as shown in FIG. 3, the cutting tool assembly has a weight which is reduced without reducing a rigidity of the tool assembly, thereby making it possible to use a face milling cutter 20 having a larger cutting diameter in a small-sized machine tool with a spindle nose of BT No. 30 (7/24 taper No. 30). In the present embodiment, the weight of the cutting tool assembly is about 2 kg, while the cutting diameter D2 of the face milling cutter 20 is about 125 mm.

The arbor 10 serves as a cutting tool holder for holding the face milling cutter 20. The arbor 10 is attached at its tapered shank portion 11 to the MC (not shown), while holding the face milling cutter 20. The arbor 10 includes, in addition to the tapered shank portion 11 with a taper of 7/24, an annular flange portion 12, protrusions (pins) 13 and a positioning boss 14. The tapered shank portion 11 and the annular flange portion 12 are constructed to have dimensions of BT No. 30 which are specified in JIS-B6339, so that the arbor 10 can be accepted in the machine tool with the BT No. 30 spindle nose.

A pull stud bolt (not shown) is provided to be tightly screwed into an internally threaded hole formed in an upper end face of the arbor 10. When the arbor 10 is attached to the MC, the tapered shank portion 11 is fitted into the spindle nose of the MC. In this instance, the pull stud bolt fixed to the arbor 10 is drawn by a mechanism built in the spindle of the MC, whereby tapered surfaces of the shank portion 11 and the spindle nose of the MC are held in close contact with each other.

The annular flange portion 12 is located on the lower side of the shank portion 11, and has a circumferentially extending V-shaped groove 12a and a pair of driving slots 12b. The V-shaped groove 12a is brought into engagement with an arm of the automatic tool changer, so that the cutting tool assembly 1 is carried by the arm when the tool assembly 1 is loaded into the spindle from a tool magazine, or when the tool assembly 1 is unloaded from the spindle. The pair of driving slots 12b are brought into engagement with respective driving keys which protrude from an end face of the spindle, so that the tool assembly 1 is rotatable together with the spindle while being attached to the spindle. The pair of driving slots 12b are located in respective positions which are diametrically opposed to each other, as shown in FIG. 1B.

The arbor 10 is held in contact, at its contact surface provided by a lower end face 12c of the annular flange portion 12, with a contact surface 22a of the face milling cutter 20. A plurality of protrusions are provided on the lower end face 12c of the arbor 10 such that the protrusions are substantially equally spaced apart from each other in the circumferential direction. In the preferred embodiment, the plurality of protrusions are provided by three pins 13 which are respectively fitted in three fitting holes formed in the lower end face 12c. In FIG. 2B, the three pins 13 are spaced equally apart from one another in a circumferential direction of the arbor. Further, the three pins are positioned relative to the pair of driving slots 12b such that one of the pins 13 is farthest from the driving slots 12b and two remaining pins 13 do not overlap with the pair of driving slots 12b as seen in an axial direction of the cutting tool assembly. The pins 13 are fitted or received in receiving holes 23 which are formed in the contact surface 22a of the face milling cutter 20 as shown in FIGS. 2A and 2B. The pins 13 and the receiving holes 23 cooperate with one another to constitute a relative-rotation preventing mechanism for preventing rotation of the face milling cutter 20 relative to the arbor 10, namely, preventing displacement of the face milling cutter 20 relative to the arbor 10 in the circumferential direction.

Since the relative-rotation preventing mechanism is provided by the pins 13 and the receiving holes 23, the arbor 10 does not have to be provided with the conventionally required components shown in FIG. 3, i.e., the keys 105 and the axial extension portion 103 (to which the keys 105 are fixed).

The elimination of the axial extension portion 103 makes it possible to remarkably reduce an axial length of the arbor 10 and also a distance over which the arbor 10 projects outwardly from the end face of the spindle when attached to the spindle. The reduction of the axial length of the arbor 10 leads to advantageous reduction of the weight of the arbor 10 without undesirable reduction of the rigidity of the arbor 10, thereby making it possible to use the face milling cutter 20 having the larger cutting diameter in the small-sized MC with the spindle nose having the size of No. 30.

As shown in FIG. 1B, the positioning boss 14 is formed on the central portion of the contact surface 12c of the flange portion 12. This positioning boss 14 is fitted in a positioning hole 24 which is formed in the contact surface 22a of the face milling cutter 20 as shown in FIGS. 2A and 2B. The hexagonal-head bolt 300 (shown in FIG. 3) as a fastener is provided to be screwed into an internally threaded hole 15 which is formed in an axial end face of the positioning boss 14 of the arbor 10, so that the face milling cutter 20 is tightened between the arbor 10 and the bolt 300.

The positioning boss 14 has an outside diameter D1 which is preferably about 22–27 mm. In the present embodiment, the outside diameter D1 of the boss 14 is about 25.4 mm. If the outside diameter D1 were smaller than 22 mm, a cylindrical wall defining the internally threaded hole 15 (M12×1.75) would have a considerably small thickness, probably resulting in an insufficient strength of the arbor 10.

If the outside diameter D1 were larger than 27 mm, a radial distance between the outer circumferential surfaces of the annular flange portion 12 and the positioning boss 14 would be considerably small, namely, a radially outer portion of the contact surface 12c utilizable for the provision of the protrusions would be considerably small. In such a case, it would be difficult to employ, as the protrusions, pins 13 having sufficiently large diameters, thereby making it difficult to provide the relative-rotation preventing mechanism with a sufficient strength. Further, the excessively large outside diameter D1 of the positioning boss 14 causes the positioning hole 24 of the face milling cutter 20 to have an excessively large inside diameter. The excessively large inside diameter of the positioning hole 24 leads to a considerable large outside diameter of a core portion 22 which provides the contact surface 22a, thereby inevitably increasing the weight of the face milling cutter 20. In this case, due to the limitation in the weight of the tool assembly usable in the machine tool with the BT No. 30 spindle nose, the face milling cutter 20 can not be given a sufficiently large cutting diameter.

The face milling cutter 20 is made of a steel material, and is constituted principally by the above-described core portion 22 having the holes 23, 24, and also a blade holding portion 21 extending radially outwardly from the core portion 22, as shown in FIGS. 2A and 2B. The face milling cutter 20, as attached to the spindle of the MC through the arbor 10, is given a torque generated by the MC and transmitted via the arbor 10, so as to be rotated. It is noted that this face milling cutter 20 is designed to machine mainly a light metal work material such as aluminum-made part.

The blade holding portion 21, circumferentially surrounding the core portion 22, holds a plurality of cutting blades in the form of five throwaway or replaceable cutting inserts 25. The replaceable cutting inserts 25, held in a radially outer end portion of the blade holding portion 21, have respective radially outer ends which cooperate with one another to define the cutting diameter D2 of the face milling cutter 20. Owing to the small number (i.e., five) of the cutting inserts 25, it is possible to reduce a cutting resistance acting on the cutter 20 and accordingly reduce a load acting on a spindle holding the cutter 20. Therefore, even where a cutting operation is effected with this cutter 20 of the large cutting diameter in the small-sized machine with the BT No. 30 spindle nose, the cutter 20 can be moved relative to a workpiece at a high feed rate so that the cutting operation can be carried out in a high degree of machining efficiency.

While the cutting diameter D2 of the face milling cutter 20 is about 125 mm in the present embodiment, a preferable range of this cutting diameter D2 is about 50–160 mm. If the cutting diameter D2 were larger than 160 mm, this size would be too large for the No. 30 spindle nose, making it difficult to satisfactorily perform a cutting operation. Further, when the cutter 20 with the cutting diameter D2 larger than 160 mm is accommodated in a pocket of the tool magazine, there would be a risk of interference of the cutter 20 with another cutting tool accommodated in the adjacent pocket of the magazine.

The core portion 22, having a substantially cylindrical shape, is circumferentially surrounded by the blade holding portion 21, and projects upwardly from the blade holding portion 21. The core portion 22 has an upper end face providing the contact surface 22a at which the cutter 22 is held in contact with the contact surface 12c of the arbor 10. In the contact surface 22a, there are formed three receiving holes 23 which receive the respective pins 13.

In addition to the receiving holes 23, the positioning hole 24 is formed in the contact surface 22a of the face milling cutter 20, such that the positioning hole 24 is located in a central portion of the surface 22a while the receiving holes 23 are located radially outwardly of the positioning hole 24. The positioning hole 24 has an inside diameter D3 which is preferably about 22–27 mm. In the present embodiment, the inside diameter D3 of the positioning hole 24 is about 25.4 mm. If the inside diameter D3 were larger than 27 mm, the outside diameter of the core portion 22 would have to be increased for providing the core portion 22 with sufficient rigidity or strength, thereby inevitably increasing the weight of the face milling cutter 20. In this case, due to the limitation in the weight of the tool assembly usable in the machine tool with the BT No. 30 spindle nose, the face milling cutter 20 can not be given a sufficiently large cutting diameter.

The face milling cutter 20 has an axial length or height h (corresponding to a distance between the lower end of the blade holding portion 21 and the upper end face 22a of the core portion 22) which is as small as about 40 mm, so that the milling cutter 20 can be adapted to have a small weight. Even where the axial height h of the cutter 20 is intended to be minimized in the interest of reducing the weight of the cutter 20, it is preferable that the axial height h of the cutter 20 is not smaller than 35 mm. This is because the conventional bolt 300 (shown in FIG. 3) can be used also for the present tool assembly 1, where the axial height h of the cutter 20 is not smaller than 35 mm. The use of the conventional bolt 300 eliminates a necessity of producing a screw bolt that is exclusively used for the present tool assembly 1, thereby reducing a cost required for manufacture of the tool assembly 1.

The tool assembly 1 constructed according to the embodiment of the invention is provided by assembling the arbor 10 and the face milling cuter 20 as follows:

(a) The positioning boss 14 and the three pins 13 of the arbor 10 are introduced into the positioning hole 24 and the three receiving holes 23 of the cutter 20, such that arbor 10 and the cutter 20 are attached to each other with their contact surfaces 12c, 22a being held in contact with each other.

(b) The hexagonal-head bolt 300 is then screwed into the internally threaded hole 15 formed in the end face of the positioning boss 14 of the arbor 10, such that the cutter 20 is tightened between the arbor 10 and the bolt 300.

While the arbor 10 and the cutter 20 are being thus fastened to each other, the arbor 10 and the cutter 20 are prevented from being rotated relative to each other, owing to the engagements of the pins 13 and the receiving holes 23.

There will next be described a test which was conducted by using a conventional face milling cutter. As discussed above in "Discussion of the Related Art", there are many workpieces each of which can be machined at its surface with a single tool path of a large-sized face milling cutter (like the cutter 20 of the tool assembly 1 constructed according to the invention) but can not be machined at its surface with a single tool path of a small-sized face milling cutter which is commonly used in the machine tool with the BT No. 30 spindle nose, so that such a workpiece has to be machined with successive two or more of tool paths in a machining operation with the small-sized face milling cutter. This test was conducted under a cutting condition as specified below, for the purpose of confirming an actual amount of the step formed along an overlapped portion of the surface which portion was subjected to a tool path of the cutter and also to the subsequent tool path of the cutter.

[Cutting Condition]
Used machine: Horizontal-type machining center (spindle nose: BT No. 30, spindle drive motor: 5.5 kw)
Cutting speed: V (peripheral speed of cutter)=1187 m/min N (number of revolutions)=6000 rpm
Feed rate: 0.05 mm/tooth
Width of cut: 50 mm
Depth of cut: 0.5 mm
Workpiece: JIS-A7075 (Aluminum)
Cutting diameter of cutter: 63 mm
Number of cutting blades or teeth: 5

Since the width of cut was 50 mm while the workpiece had a width of about 80 mm (as measured in a direction perpendicular to a direction of the tool paths), the above-described overlapped portion of the machined surface had a width of about 20 mm. The amount of the step was measured at three points which are spaced apart from one another in the direction of the tool paths. The step amount measured at the first point was 5 μm. The step amount measured at the second point was 7 μm. The step amount measured at the third point was 6 μm. That is, in the test, it was confirmed that the average amount of the step was 6 μm. Due to such an unignorable amount of the step, conventionally, the face milling has to be effected in the machine tool of the BT No. 40 spindle nose even where the other machining (e.g., drilling and tapping) following the face milling is effected in the machine tool of the BT No. 30 spindle nose. Such a transfer of the workpiece between the two machine tools requires additional steps and accordingly leads to deterioration in the machining efficiency.

On the other hand, the cutting tool assembly 1 according to the embodiment of the invention makes it possible to complete the face milling to the above-described workpiece with a single tool path even where the face milling is effected in the machine tool of the BT No.30 spindle nose, since the tool assembly 1 carries the face milling cutter 20 with the cutting diameter D2 of about 125 mm that is larger than the width of the workpiece. Consequently, it is possible to avoid the formation of the undesirable step on the machined surface of the workpiece, without the cumbersome operation of transferring the workpiece to another machine tool.

While one embodiment of the present invention has been described above in detail for illustrative purpose only, it is to be understood that the invention is not limited to the above-described embodiment but may be otherwise embodied.

For example, the three pins 13 as the protrusions are provided on the contact surface 12c of the arbor 10 (which is provided by the lower end face 12c of the flange portion 12) in the above-described embodiment. However, the number of the pins 13 does not have to be necessarily three, but may be more or less than three.

Further, while the pins 13 as the protrusions are arranged so as to be substantially equally spaced apart from each other in the circumferential direction in the above-described embodiment, the pins 13 may be unequally spaced apart form each other in the circumferential direction.

Where the protrusions are provided by the pins 13 which are fitted in the fitting holes formed in the contact surface 12c of the arbor 10 as in the above-described embodiment, it is preferable, irrespective of the number of the pins 13 and the circumferential spacing distances between the pins 13, that the pins 13 are positioned such that the pins 13 do not overlap with the driving slots 12b (which are formed in the outer circumferential surface of the annular flange portion 12 of the arbor 10), as seen in the axial direction of the arbor 10. The pins 13 are spaced equally apart from one another in the circumferential direction of the arbor. In the case of using three pins, the pins 13 are positioned relative to the pair of driving slots 12b such that one of the pins 13 is farthest from the driving slots 12b and two remaining pins 13 do not overlap with the pair of driving slots 12b as noted above. This preferable arrangement is effective to avoid This preferable arrangement is effective to avoid reduction of the rigidity of the annular flange portion 12, namely, to assure the rigidity of the entirety of the cutting tool assembly 1, for thereby making it possible to perform a machining operation with a high degree of accuracy.

It is to be understood that the present invention may be embodied with various other changes, modifications and improvements, which may occur to those skilled in the art, without departing from the spirit and scope of the invention defined in the following claims:

What is claimed is:

1. A cutting tool assembly comprising: an arbor including a tapered shank portion which has a taper of 7/24 and a spindle nose size of No.30; a cutting tool having at least one cutting blade and fastened to said arbor, said cutting tool being a face milling cutter having a cutting diameter of 80–160 mm; a fastener for fastening said cutting tool to said arbor; and a relative-rotation preventing mechanism for preventing rotation of said cutting tool relative to said arbor; wherein said cutting tool assembly has a weight of not larger than 3 kg; wherein said arbor and said cutting tool have respective contact surfaces which are held in contact with each other; wherein said relative-rotation preventing mechanism is configured by three receiving holes on one of said contact surfaces, and three pins which are formed on the other of said contact surfaces, where an inner shape and size of said receiving hole is substantially identical to an outer shape and size of the pin so that each pin is fitted in the corresponding receiving hole; wherein said arbor comprises an annular flange portion which provides the contact surface and has a pair of driving slots formed in an outer circumferential surface of said annular flange portion; and wherein said three pins are spaced equally apart from one another in a circumferential direction of the arbor, and said three pins are positioned relative to said pair of driving slots such that one of said pins is farthest from said driving slots and the two remaining pins do not overlap with said pair of driving slots as seen in an axial direction of said cutting tool assembly.

2. A cutting tool assembly according to claim 1,
wherein said cutting tool has a positioning hole which is formed in a central portion of the contact surface of said cutting tool, and said arbor has a positioning boss which is formed on a central portion of the contact surface of said arbor and received in said positioning hole, and wherein said positioning hole and said positioning boss have an inside diameter and an outside diameter, respectively, which are not smaller than 22 mm and are not larger than 27 mm.

3. A cutting tool assembly according to claim 1, wherein said cutting tool has an axial length that is not larger than 40 mm.

4. A cutting tool assembly according to claim 1, wherein a number of said at least one cutting blade is not larger than six.

5. A cutting tool assembly according to claim 1,
wherein said three receiving holes are located radially outwardly of an axis of said cutting tool assembly about which said cutting tool assembly is to be rotated, and
wherein said three pins are located in respective positions which are aligned with said thee receiving holes.

6. An arbor which is to be fastened to a cutting tool, for establishing a cutting tool assembly, said arbor comprising: a tapered shank portion which has a taper of 7/24 and a spindle nose size of No. 30; a contact surface which is to be brought into contact with a surface of said cutting tool when said arbor fastened to said cutting tool; an annular flange portion which provides the contact surface and has a pair of driving slots formed in an outer circumferential surface of said annular flange portion; and a relative-rotation preventing mechanism for preventing rotation of said cutting tool relative to said arbor when said arbor is fastened to said cutting tool; wherein said relative-rotation preventing mechanism is configured by three pins which are formed on said contact surface of the arbor; wherein said arbor is fastened to said cutting tool which is a face milling cutter having a cutting diameter of 80–160 mm, and wherein an outer shape and size of the protrusion is substantially identical to an inner shape and size of a receiving hole formed on said cutting tool, thereby snugly fitting said protrusion into said receiving hole on said cutting tool; wherein said three pins are spaced equally apart from one another in a circumferential direction of the arbor, and said three pins are positioned relative to said pair of driving slots such that one of said pins is farthest from said driving slots and two remaining pins do not overlap with said pair of driving slots as seen in an axial direction of said cutting tool assembly.

7. An arbor according to claim 6, wherein each of said three pins is fitted in a fitting hole formed on said surface of said cutting tool.

8. An arbor according to claim 6, further comprising:
a positioning boss which is formed on a central portion of said contact surface, for positioning said cutting tool in a predetermined position relative to said arbor when said cutting tool is fastened to said arbor,
wherein said positioning boss has an outside diameter which is not smaller than 22 mm and is not larger than 27 mm.

* * * * *